United States Patent

Van Ryzin et al.

[11] Patent Number: 6,031,797
[45] Date of Patent: Feb. 29, 2000

[54] MEDIA PLAYBACK DEVICE CAPABLE OF SHUFFLED PLAYBACK BASED ON A USER'S PREFERENCES

[75] Inventors: John M. Van Ryzin, Madison; Peter Douma, Wyckoff, both of N.J.

[73] Assignees: Sony Corporation, Tokyo, Japan; Sony Electronics, Inc., Park Ridge, N.J.

[21] Appl. No.: 09/095,832

[22] Filed: Jun. 11, 1998

[51] Int. Cl.[7] ................................. G11B 17/22
[52] U.S. Cl. ............................. 369/33; 369/30
[58] Field of Search ................. 369/33, 32, 30, 369/34, 36, 47, 48, 54

[56] References Cited

U.S. PATENT DOCUMENTS

| | | | |
|---|---|---|---|
| 4,899,331 | 2/1990 | Masaki et al. | 369/33 |
| 5,255,250 | 10/1993 | Dewolf et al. | 369/32 |
| 5,301,172 | 4/1994 | Richards et al. | 369/32 |
| 5,408,448 | 4/1995 | Carman | 369/33 |
| 5,798,921 | 8/1998 | Johnson et al. | 364/400.01 |

*Primary Examiner*—Tan Dinh
*Attorney, Agent, or Firm*—Frommer Lawrence & Haug, LLP.; William S. Frommer

[57] ABSTRACT

A system and method for providing automated generation of program groups used in shuffled playback. The playback system acquires "content information" concerning programs on subject media, and generates shuffled playback groups by comparing the content information to user entered "desired-group information". In one illustrative embodiment the content information is included on the media themselves. In a second illustrative embodiment, the content information is included in a database.

12 Claims, 4 Drawing Sheets

MEDIA PLAYBACK DEVICE CAPABLE OF SHUFFLED PLAYBACK BASED ON A USER'S PREFERENCES

FIELD OF THE INVENTION

This invention relates to reproducing pre-recorded programs, and more particularly, to generating program groups for use in shuffled reproduction of pre-recorded programs.

BACKGROUND OF THE INVENTION

A common feature in current program reproducing devices is random (or "shuffled") playback of programs within a selected group. For example, an audio CD player that stores a multiple of CDs (or "Mega CD player") may be set to randomly play back music tracks from the stored CDs or from a selected subset of the stored CDs. Thus, for instance, a Mega CD player user may create a group that consists of all the Christmas songs included on CDs that are stored in the player, and then select that group to play as background music during a Christmas party.

Despite the popularity of the shuffled playback feature there are some drawbacks in the way the feature is currently implemented. One drawback is that the grouping of programs is time consuming. In order to create a group a user must specify the location of each program that is to be added to group. That is, the user must locate the desired programs by referencing the playlists of the individual media and then input the location of the desired programs into the playback device (e.g. enter the disk number and track number for each CD musical selection to be included in a group).

Another drawback is that existing groups are easily disarranged. For example, the locations of CDs within a group may become disarranged when those CDs are transported from a Mega CD player to a car CD player and then back to the Mega CD player. Such disarrangement upsets the Mega CD player's reference positions for each disk, and in order to maintain a desired grouping the user must once again specify the locations of programs in the group.

OBJECTS AND SUMMARY OF THE INVENTION

It has been recognized that an automated group specification system would greatly enhance the shuffled playback feature of media playback devices.

Accordingly, it is an object of the present invention to provide a technique for automatically specifying groups of programs for shuffled playback. This object is achieved through a system that acquires content information concerning programs on subject media, and generates shuffled playback groups by comparing the content information to user entered "desired-group information".

In an illustrative embodiment of the invention, the content information is included on the media themselves. When the media are loaded into a player, such as a Mega CD player, the player automatically downloads the content information from the media and compares the information with the desired-group information. If there is a match between the content information for a particular program and the desired-group information, the program is included in a shuffled playback group.

In another illustrative embodiment of the invention, the content information is included in a database. In this embodiment, when a medium is loaded into a player the medium is identified (e.g. through table of contents information) and the database is used to cross-reference the identity of the medium to the medium's content information. Once the content information for a particular medium has been determined, the content information for each program in the medium is compared with desired-group information, and if there is a match between the content information for a program and the desired-group information, the program is included in a shuffled playback group.

By automating group specification, the invention overcomes the drawbacks associated with current shuffled playback implementations.

BRIEF DESCRIPTION OF THE DRAWINGS

The following detailed description, given by way of example and not intended to limit the present invention solely thereto, will best be appreciated in conjunction with the accompanying drawings, in which.

DETAILED DESCRIPTION OF CERTAIN PREFERRED EMBODIMENTS

Figure 1:
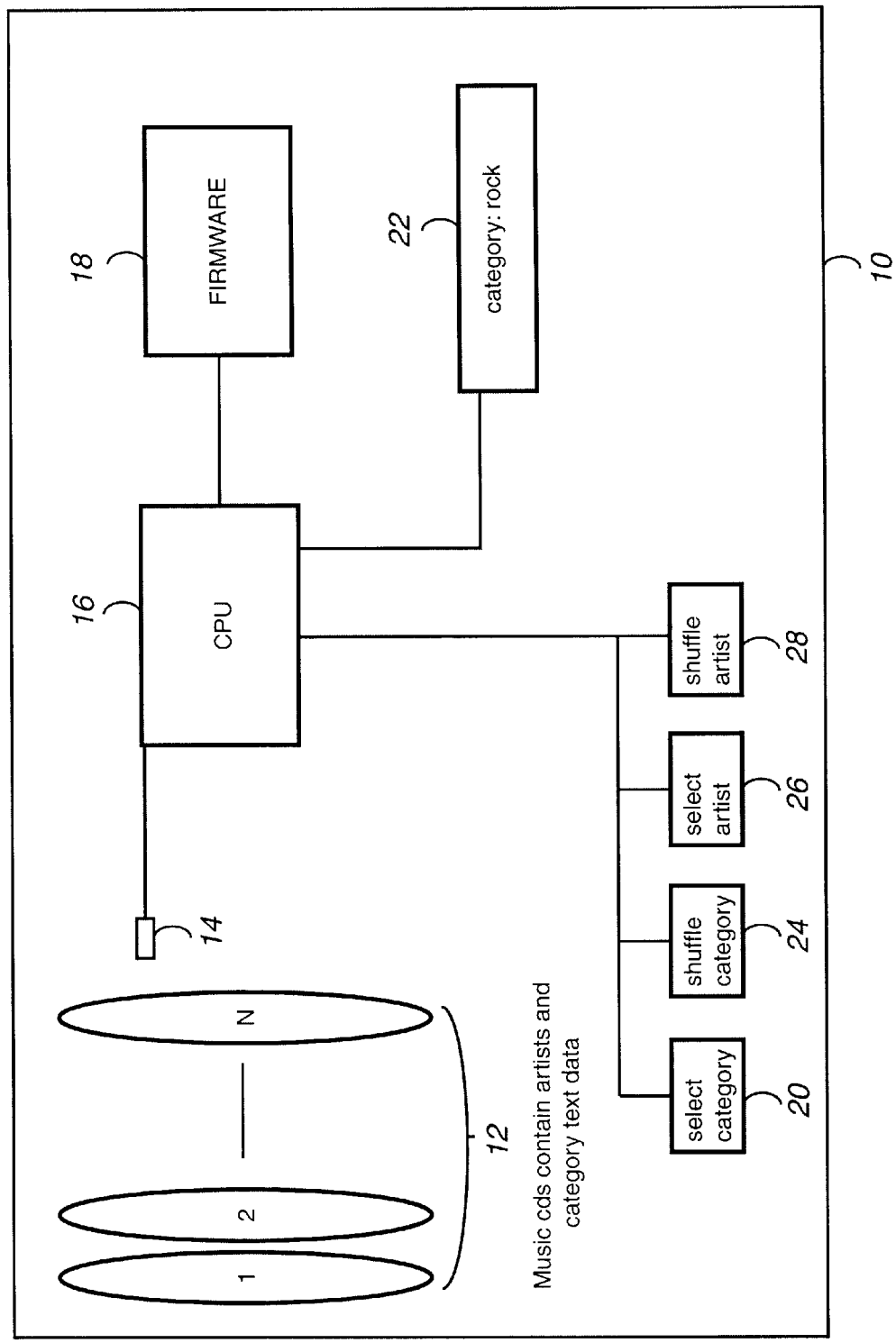
FIG. 1 is a schematic diagram of a Mega CD player in accordance with a first embodiment of the present invention.

FIG. 1 shows a Mega CD player 10 suitable for implementing the present invention. The invention is not limited to implementation on a Mega CD player; however, for purposes of brevity of description only the Mega CD player embodiment will be described in detail. In light of the description of the Mega CD player embodiment, implementation of the invention on other types of media playback devices will become readily apparent to those of ordinary skill in the art.

As can be seen from FIG. 1, the Mega CD player is equipped to hold up to "N" CDs 12. To read a disk (disk N in the figure), the disk is positioned in relation to an optical pick-up 14 such that the optical pick up can irradiate a beam of light onto the disk and pick-up the reflections of the beam from the disk. The reflections are indicative of the arrangement of pits on the disk, and the arrangement of pits are indicative of the data stored on the disk. Therefore by monitoring the reflections, the data on the disk can be read. In this regard, the optical pick-up converts the reflections into an electrical signal and passes the signal to a CPU 16 where the data can be converted into a suitable playback format.

In the embodiment of FIG. 1, each of the disks 12 includes content information concerning each song on the disk. This content information may include the artist who performed each song on the disk and the category to which each song on the disk belongs (e.g. rock, classical, soul). Upon insertion of a disk into the player, the optical pick-up and/or disk is positioned such that the content information for the disk can be read and passed to the CPU which, in turn, passes the information to firmware 18 for storage. The firmware may, for instance, include a Random Access Memory (RAM) and the necessary RAM access software.

It should be noted that there are many ways in which content information may be included on the disks. These include: using the "CD text" format; incorporating content information into new audio formats, such as "Super CD"; and incorporating content information into "Minidiscs".

In any event, once all the content information for each of disks 12 has been stored in the firmware, the system may perform shuffle playback of any group of songs included on the disks. For purposes of illustration, grouping according to category and artist will be described; however, the invention is not limited to such groupings and may include groupings such as those based on year of recording, instrumental/non-instrumental, and the like.

To select a category in the FIG. 1 embodiment, the user presses a select category button 20. In response, the CPU retrieves the available categories from the firmware and displays the first available category (e.g. rock) on a display 22. At this point the user presses a shuffle category button 24 to perform shuffle play of all the songs in the displayed category that are available on disks 12. Otherwise, the user may again press the select category button to display the next available category.

Upon selection of a desired category and pressing of the shuffle category button, the CPU accesses the firmware to determine the available songs in the selected category and randomly selects and plays songs within the selected category. The CPU may transmit the necessary signals for positioning the optical head and/or disks for playback of the selected songs.

A select artist button 26 and a shuffle artist button 28 are also supplied on the Mega CD player of FIG. 1. These buttons are used for implementing artist based shuffle play in the same manner that category shuffle play is implemented using buttons 20 and 24. Accordingly, buttons 26 and 28 will not be described in detail.

Figure 2:
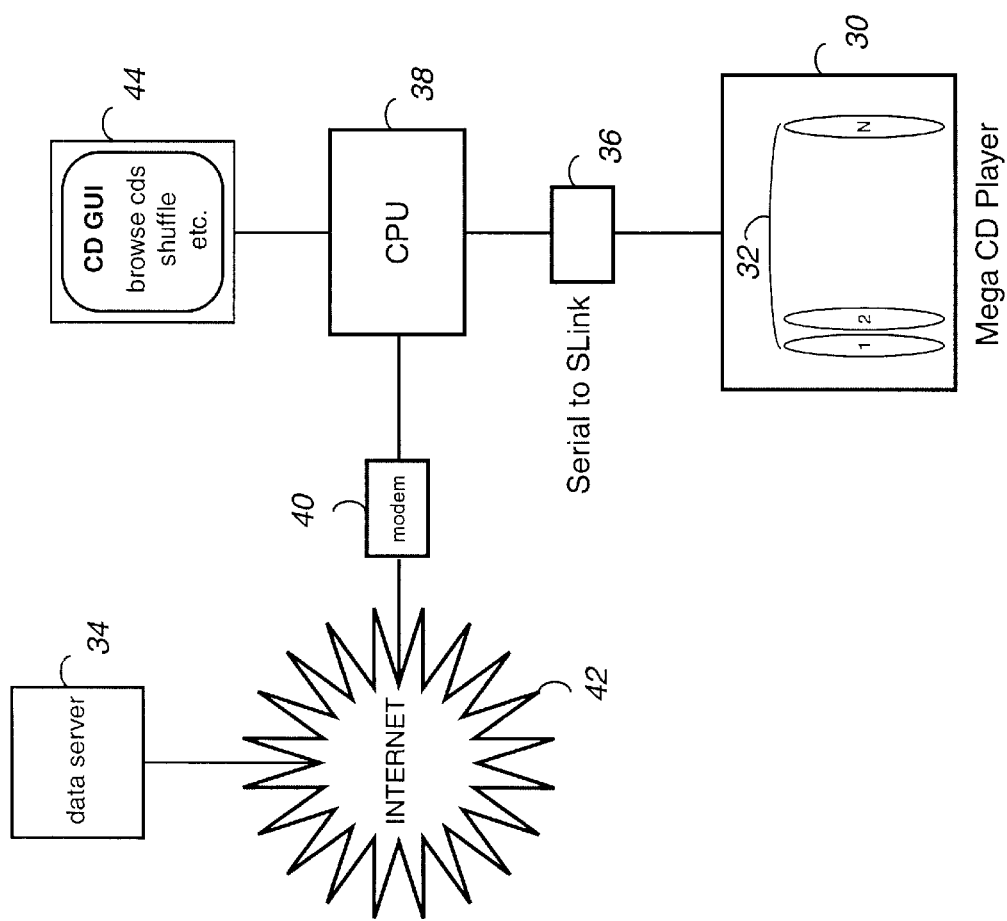
FIG. 2 is a schematic diagram of a Mega CD player system in accordance with a second embodiment of the present invention.

FIG. 2 shows a Mega CD player system in accordance with a second embodiment of the present invention. As can be seen from the figure, the second embodiment includes a Mega CD player 30; however, like the first embodiment of the invention, the second embodiment is not limited to implementation on a Mega CD player. Nevertheless, for purposes of brevity of description only the Mega CD player configuration of the second embodiment will be described in detail.

As was the case in the first embodiment, the player of the second embodiment is configured to hold "N" CDs 32, and includes an optical pick-up (not shown) for accessing the data on those CDs. But, unlike the first embodiment, the second embodiment, does not require that the disks include content information. Rather in the second embodiment, content information is stored in a data server 34. In the FIG. 2 configuration, the Mega CD player is coupled to the data server through a Serial to SLink converter 36, a CPU 38, a modem 40, and the internet 42. Of course, the particular coupling configuration shown in the figure is merely illustrative, and other couplings may be employed.

With respect to the FIG. 2 coupling, it should be noted that the Serial to SLink converter is used to convert SLink compatible signals to CPU compatible signals, and vice versa. It should also be noted that the modem, internet, and data server portion of the coupling may be realized through any one of several techniques well known in the art, and that the CPU may be an integral part of a set-top box, a WebTV unit, a Net Receiver unit, or a personal computer running appropriate Home Audio-Video (HAV) software.

In order to retrieve the content information for a particular one of the disks 32, the player must first uniquely identify the disk. This may be accomplished in several ways. One way is by reading the table of contents of the disk and observing the number of tracks on the disk and the duration of each track. The table of contents information is then sent to the CPU where the information is used to generate a unique ID for the disk. The CPU then sends the unique ID—via the modem and internet—to the data server where the ID is used to retrieve the content information for the subject disk. A second way of retrieving content information also involves reading the table of contents of the disk and observing the number of tracks on the disk and the duration of each track. However, the second technique does not require that the CPU generate a unique ID for the disk. Rather the table of contents information is passed to the data server which then uses the data to cross-reference the disk's content information.

Content information retrieved at the data server is passed back to the Mega CD player via the internet, modem, CPU and Serial to SLink. Once all the content information for each of disks 32 has been retrieved and stored in the player, the system may perform shuffle playback of any group of songs available on disks 32. As was the case in the FIG. 1 embodiment, many playback groupings (such as category grouping and artist grouping) are possible. Furthermore, buttons like the select category, shuffle category, select artist and shuffle artist buttons described above may be provided on player 30 for the purpose of performing the same functions described in relation to the first embodiment. As an option, group selection and shuffle playback may be controlled through the CPU (e.g. by keyboard commands entered through a personal computer).

In addition, the FIG. 2 configuration includes a display 44 for displaying information about the system. Displayed information may include items such as a list of CDs currently stored in player 30—the stored CD information having been obtained from the player and/or data server. Moreover, display 44 may be used as a Graphical User Interface (GUI), which allows functions similar to those of the select and shuffle buttons to be performed via "point and click".

At this point both FIGS. 1 and 2 will be referred to in describing a third embodiment of the invention. A third embodiment of the invention is implemented by providing a "database disk" for storage in a Mega CD player. The database disk contains the same data as that stored in data server 34. When a disk (other than the database disk) is inserted into the player, the player uniquely identifies the disk and retrieves the content information for that disk from the database disk, or alternatively, from data which has already been downloaded from the database disk. Thus, the third embodiment of the invention may be viewed as a "hybrid" of the first and second embodiments. In the third embodiment, the "select" and "shuffle" functions may be implemented in the same manner that they are implemented in the first or second embodiments.

Figure 3A:
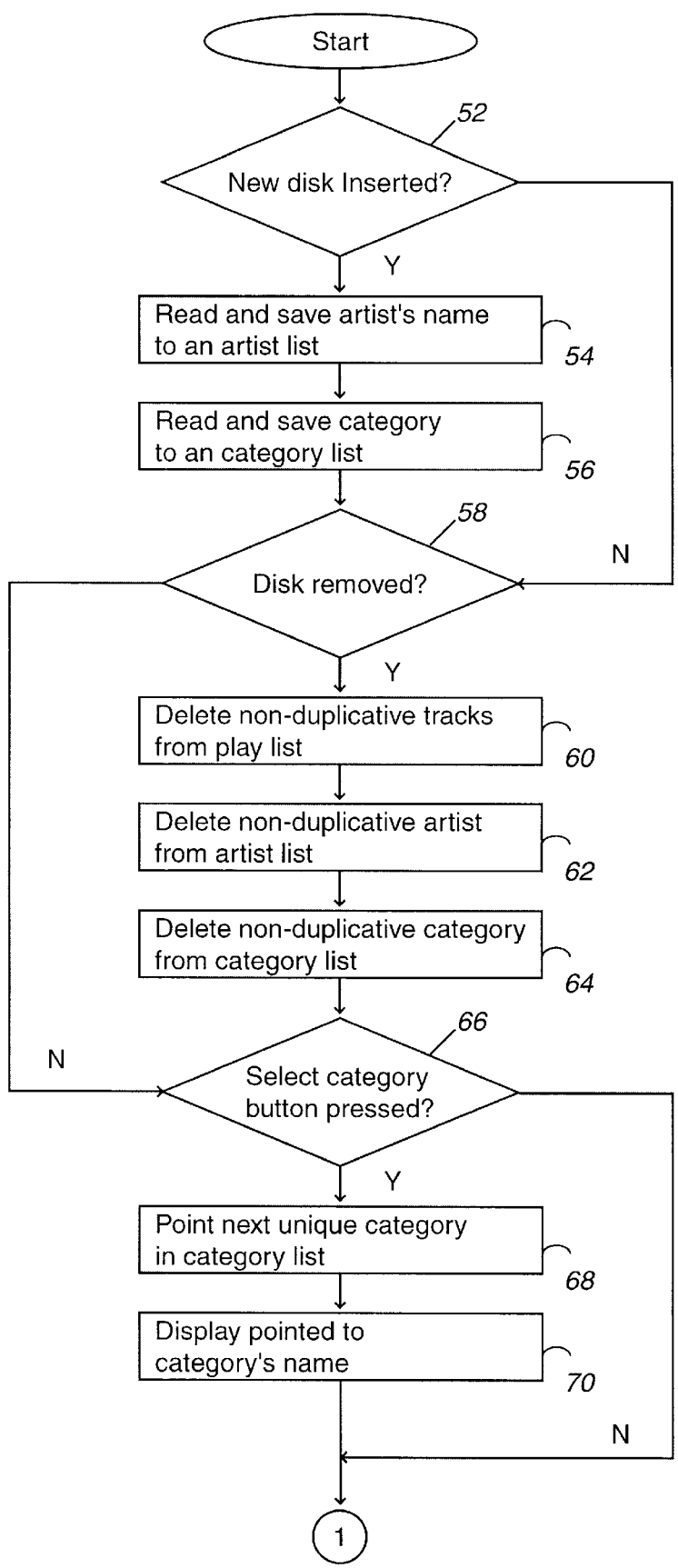
FIGS. 3A and 3B make up a flowchart depicting an illustrative process for implementing shuffle play in accordance with the invention.
Figure 3B:
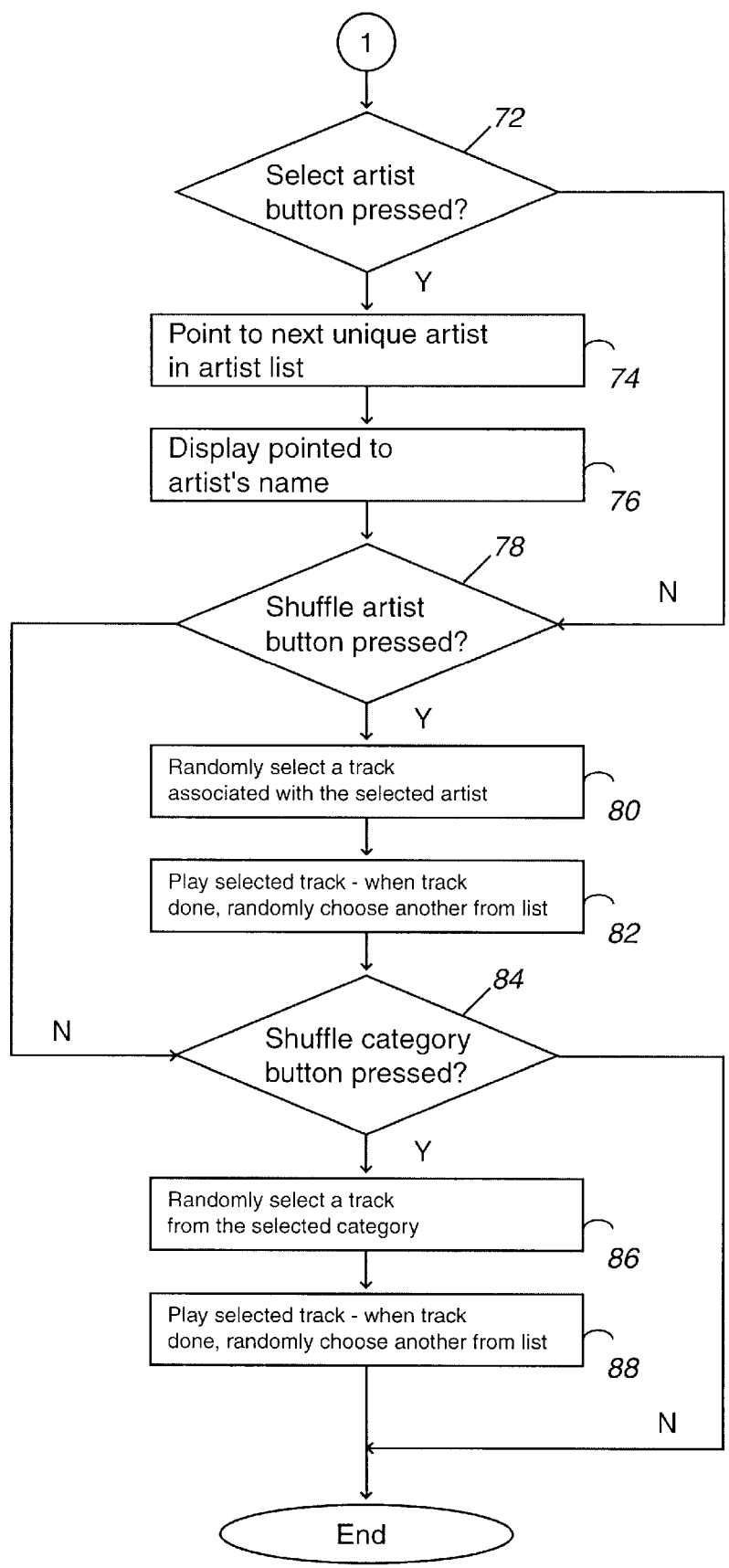

FIGS. 3A and 3B make up a flowchart depicting an illustrative process for implementing shuffle play in any one of the three above-described embodiments. The first step in the process is to check whether or not a new disk has been inserted into the Mega CD player (step 52). If a new disk has been inserted, the artist associated with the disk is determined (either from the disk itself or from a database), and the artist's name is saved in an artist list (step 54). The category to which the disk belongs is also determined (either from the disk itself or from a database), and the disk's category is saved in a category list (step 56).

The process includes checking whether or not the disk has been removed from the Mega CD player (step 58). If the disk has been removed, the tracks of the disk are removed from a list of available tracks (tracks available on other disks in the player are not removed) (step 60), the artist associated with the disk is removed from the artist list (unless another disk associated with the artist is available in the player) (step 62), and the category of the disk is removed from the category list (unless another disk in the same category is available in the player) (step 64).

Next, a determination is made as to whether or not the select category button has been pressed (step 66). If the select category button has been pressed, the system "points" to the next unique category in the category list (step 68) and displays that category's name (step 70). Similarly, a determination is made as to whether or not the select artist button has been pressed (step 72), and if so, the system "points" to the next unique artist in the artist list (step 74) and displays that artist's name (step 76).

After checking the selection buttons, the system checks to see if the shuffle artist button has been pressed (step 78). If the shuffle artist button has been pressed, the system randomly selects a track from the tracks in the playlist that are associated with the selected artist (step 80). The system plays the randomly selected track, and when the track is done, randomly selects another track from the artist's tracks which are included in the playlist (step 82).

The system also checks to see if the shuffle category button has been pressed (step 84). If the shuffle category button has been pressed, the system randomly selects a track from the tracks in the playlist that are associated with the selected category (step 86). The system plays the randomly selected track, and when the track is done, randomly selects another track from the tracks which are within the category and included in the playlist (step 88).

While the present invention has been particularly shown and described in conjunction with preferred embodiments thereof, it will be readily appreciated by those of ordinary skill in the art that various changes may be made without departing from the spirit and scope of the invention. For example, although the invention has been described in the context of having a user select one type of delimiter to select a group (e.g. artist or category), it should be noted that a group may be selected by applying multiple delimiter types. For instance, the Mega CD player may be set to shuffle play all Christmas music by a particular artist. Furthermore, the invention is not limited to the selection of one delimiter for a given type. For example, the Mega CD player may be set to shuffle play the available tracks from three recording artists, or in two categories.

Therefore, it is intended that the appended claims be interpreted as including the embodiments described herein, the alternatives mentioned above, and all equivalents thereto.

What is claimed is:

1. An apparatus for generating groups of pre-recorded programs for shuffled playback, comprising:

means for obtaining content information for said pre-recorded programs;

means for comparing said content information to a desired-group information; and means for adding one of said programs to a shuffled playback group when said content information for said program matches said desired-group information.

2. The apparatus according to claim 1, wherein said content information includes a program category.

3. The apparatus according to claim 1, wherein said content information includes an artist identifier.

4. The apparatus according to claim 1, wherein said content information is included in at least one recording medium on which said programs are stored.

5. The apparatus according to claim 1, wherein said programs are stored on at least one recording medium and said content information is located in a database that is stored on at least one medium which is distinct from said at least one recording medium on which said programs are stored.

6. The apparatus according to claim 1, wherein desired-group information is selected from a list generated according to said content information.

7. A method for generating groups of pre-recorded programs for shuffled playback, comprising the steps of:

obtaining content information for said pre-recorded programs;

comparing said content information to a desired-group information; and adding one of said programs to a shuffled playback group when said content information for said program matches said desired-group information.

8. The method according to claim 7, wherein said content information includes a program category.

9. The method according to claim 7, wherein said content information includes an artist identifier.

10. The method according to claim 1, wherein said content information is included in at least one recording medium on which said programs are stored.

11. The apparatus according to claim 1, wherein said programs are stored on at least one recording medium and said content information is located in a database that is stored on at least one medium which is distinct from said at least one recording medium on which said programs are stored.

12. The method according to claim 7, wherein desired-group information is selected from a list generated according to said content information.

* * * * *